(12) United States Patent
Shahidi et al.

(10) Patent No.: US 7,376,102 B2
(45) Date of Patent: May 20, 2008

(54) ERASED FRAME AND IDLE FRAME SUPPRESSION IN A WIRELESS COMMUNICATIONS SYSTEM

(75) Inventors: Reza Shahidi, San Diego, CA (US); Vincent B. Baglin, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 91 days.

(21) Appl. No.: 11/291,364

(22) Filed: Dec. 1, 2005

(65) Prior Publication Data

US 2007/0127413 A1 Jun. 7, 2007

(51) Int. Cl.
*H04Q 7/00* (2006.01)

(52) U.S. Cl. ............ 370/331; 370/335; 370/337; 370/452; 370/517; 370/342; 455/522; 455/445; 455/450; 455/442

(58) Field of Classification Search ........ 370/331, 370/335, 452, 337, 517, 342; 714/786; 455/522, 442
See application file for complete search history.

(56) References Cited

U.S. PATENT DOCUMENTS

| | | | | |
|---|---|---|---|---|
| 5,596,571 A * | 1/1997 | Gould et al. | ........... | 370/335 |
| 5,761,431 A * | 6/1998 | Gross et al. | ........... | 709/225 |
| 5,852,405 A * | 12/1998 | Yoneda et al. | ......... | 340/825.02 |
| 5,886,992 A * | 3/1999 | Raatikainen et al. | ....... | 370/410 |
| 6,092,230 A * | 7/2000 | Wood et al. | ........... | 714/755 |
| 6,141,353 A * | 10/2000 | Li | ............. | 370/465 |
| 6,195,554 B1 * | 2/2001 | H'mimy et al. | ......... | 455/450 |
| 6,320,880 B1 * | 11/2001 | Suvanen | ................ | 370/512 |
| 6,438,119 B1 * | 8/2002 | Kim et al. | ............ | 370/335 |
| 6,480,472 B1 * | 11/2002 | Jou et al. | ............. | 370/252 |
| 6,483,919 B1 * | 11/2002 | Lund et al. | ........... | 380/247 |
| 6,490,268 B1 * | 12/2002 | Lee et al. | ............ | 370/342 |
| 6,697,364 B1 * | 2/2004 | Kekki et al. | ........... | 370/389 |
| 6,717,928 B1 * | 4/2004 | Kalliokulju et al. | ....... | 370/335 |
| 6,728,551 B2 * | 4/2004 | Chang | ................ | 455/522 |
| 6,731,948 B1 * | 5/2004 | Lee et al. | ............ | 455/522 |
| 6,876,866 B1 * | 4/2005 | Ulupinar et al. | ......... | 455/522 |

(Continued)

FOREIGN PATENT DOCUMENTS

WO 2001/18996 3/2001

(Continued)

OTHER PUBLICATIONS

3GPP TR 25.902, V6.0.0 (Sep. 2005). Technical Specification Group Radio Access Network; Iub/Iur congestion cotrol (Release 6).

*Primary Examiner*—Marceau Milord
(74) *Attorney, Agent, or Firm*—Coats & Bennett, P.L.L.C.

(57) ABSTRACT

A method of reducing loading on backhaul communications links in a wireless communications system suppresses a portion of the upward flow of frame information for idle and/or erased frames in certain situations, such as when multiple ones of such frames are successively encountered. A radio base station abstains from sending a frame header to a BSC/ANC for second and following frames of the Idle type and/or the radio base station abstains from sending a frame header to a BSC/ANC for second and following frames of the Erased type. The header may also or alternatively be suppressed for an Idle frame immediately following a Good frame. The BSC/ANC in effect fills in the suppressed frame information in such situations, forwards appropriate indications of frame type to the frame selection algorithm.

24 Claims, 7 Drawing Sheets

U.S. PATENT DOCUMENTS

| | | | |
|---|---|---|---|
| 6,901,268 B2 * | 5/2005 | Chang | 455/522 |
| 7,006,482 B1 * | 2/2006 | Choi et al. | 370/342 |
| 7,062,226 B2 * | 6/2006 | Lee et al. | 455/504 |
| 7,075,905 B2 * | 7/2006 | Chen et al. | 370/318 |
| 7,143,178 B2 * | 11/2006 | Glazko et al. | 709/231 |
| 7,177,658 B2 * | 2/2007 | Wilenegger et al. | 455/522 |
| 7,224,994 B2 * | 5/2007 | Tayloe et al. | 455/522 |
| 7,245,600 B2 * | 7/2007 | Chen | 370/335 |
| 2003/0092459 A1 | 5/2003 | Blessent | |
| 2004/0047305 A1 | 3/2004 | Ulupinar | |
| 2004/0077345 A1 | 4/2004 | Turner et al. | |
| 2005/0245279 A1 | 11/2005 | Mehrabanzad et al. | |

FOREIGN PATENT DOCUMENTS

| | | |
|---|---|---|
| WO | 03/032518 | 4/2003 |

* cited by examiner

ERASED FRAME AND IDLE FRAME SUPPRESSION IN A WIRELESS COMMUNICATIONS SYSTEM

BACKGROUND OF THE INVENTION

The present invention relates to wireless communications systems; and, more particularly, to methods of controlling the forwarding of reverse link frames and/or information about reverse link frames in the wireless communications system.

The demand for wireless data services, such as mobile Internet, video streaming, and voice over IP (VoIP), have led to the development of high speed packet data channels to provide high data rates needed for such services. High speed packet data channels are employed on the forward link in a variety of mobile communication systems, including TIA-2000 (also known as 1xEV-DV), TIA-856 (also known as 1xEV-DO), and Wideband Code Division Multiple Access (WCDMA) systems. The high speed packet data channel is a time shared channel, with downlink transmissions, e.g., from a base station to the mobile stations, typically time-multiplexed and transmitted at full power.

In addition to receiving downlink transmissions, mobile stations transmit packet data to the base stations on what is called the reverse link. While the mobile station may be served at a given time on the downlink by a single serving radio base station, the reverse link frames transmitted by that mobile station may be received by a plurality of radio base stations, such as during soft handoff. The multiple receiving radio base stations typically forward the received frames to a call anchor node in the system for further processing, such as for outer loop power control. Thus, some measure of diversity gain may be realized on the reverse link. However, in order to achieve this diversity gain, some additional traffic is placed on the backhaul communications links internal to the system. These backhaul communications links carry information conceptually "upward" in the communications system, such as from a radio base station to its controlling base station controller, or from a non-anchor base station to a call anchor base station. For example, an $A_{bis}$ link between base stations may be used as a backhaul communication link, as can an $I_{ub}$ link between a Radio Network Controller (RNC) and a Base Transceiver Station (BTS) in a Universal Mobile Telecommunications System (UMTS) system. The additional traffic placed on the backhaul communication link(s) in forwarding the relevant frame information from multiple radio base stations to the call anchor in order to achieve the diversity gain places a burden on those backhaul link(s), which, in some instances, may negatively impact overall system performance.

SUMMARY OF THE INVENTION

The present invention provides a method of reducing loading on backhaul communications links by suppressing a portion of the upward flow of frame information for idle and/or erased frames when multiple ones of such frames are successively encountered. In some embodiments, the radio base station abstains from sending a frame header to the BSC/ANC (suppresses the header) for second and following frames of the same type, if the type is either Idle or Erased. Alternatively, or in addition thereto, the radio base station may suppress the header when an Idle frame immediately follows a good frame. The BSC/ANC in effect fills in the suppressed frame information in such situations, and forwards appropriate indications of frame type to the frame selection algorithm.

In one embodiment, the present invention provides a method of controlling frame forwarding operations of a first radio base station in a wireless communications system comprising: receiving first and second successive frames from a mobile station at the first radio base station, the second frame received after the first frame; classifying the first and second frames at the first radio base station; in response to both the first and second frames being classified differently, the first radio base station sending at least a header associated with the second frame to a call anchor associated with the mobile station; the header indicating the classification of the second frame; in response to both the first and second frames being classified as erased frames, the first radio base station abstaining from sending the header to the call anchor. The available frame classifications may be good, idle, or erased. If the second frame is classified as a good frame, the first radio station may send the header and a payload associated with the second frame to the call anchor. A frame may be classified as idle if a corresponding frame boundary is encountered without receipt of corresponding frame transmissions from the mobile station. If both the first and second frames are classified as idle frames, the first radio base station advantageously abstains from sending the header to the call anchor. A corresponding apparatus is also described.

In another embodiment, the present invention provides a method of controlling frame forwarding operations of a first radio base station in a wireless communications system comprising: receiving first and second successive frames from a mobile station at the first radio base station, the second frame received after the first frame; classifying the first and second frames at the first radio base station; in response to both the first and second frames being classified differently, the first radio base station sending at least a header associated with the second frame to a call anchor associated with the mobile station; the header indicating the classification of the second frame; in response to both the first and second frames being classified as idle frames, the first radio base station abstaining from sending the header to the call anchor. The available frame classifications may be good, idle, or erased. If the second frame is classified as a good frame, the first radio station may send the header and a payload associated with the second frame to the call anchor. A frame may be classified as idle if a corresponding frame boundary is encountered without receipt of corresponding frame transmissions from the mobile station. A corresponding apparatus is also described.

In another embodiment, the present invention provides a method of controlling frame forwarding operations of a first radio base station in a wireless communications system comprising: receiving first and second successive frames from a mobile station at the first radio base station, the second frame received after the first frame; classifying the first and second frames at the first radio base station; in response to both the first and second frames being classified differently, the first radio base station: a) if the second frame is other than an idle frame, sending at least a header associated with the second frame to a call anchor associated with the mobile station; the header indicating the classification of the second frame; b) if the second frame is an idle frame and the first frame is an erased frame, sending the header to the call anchor; the header indicating the classification of the second frame; c) if the second frame is an idle frame and the first frame is a good frame, abstaining from sending the header to the call anchor; in response to both the first and second frames being classified as idle frames, the first radio base station abstaining from sending the header to the call anchor. A corresponding apparatus is also described.

In another embodiment, the present invention provides a method of supplying frame classification information to a frame selection algorithm by an anchor base station, the anchor base station having at least an idle frame receipt state; a good frame receipt state, and an erased frame receipt state; the method comprising: in response to being in the idle frame receipt state and receiving neither a frame nor a header from the first radio base station at a frame boundary, supplying an indication, corresponding to the first base station, to the frame selection algorithm indicating an idle frame and remaining in the idle frame receipt state; and, in response to being in the erased frame receipt state and receiving neither a frame nor a header from a first radio base station at a frame boundary, supplying an indication, corresponding to the first base station, to the frame selection algorithm indicating an erased frame and remaining in the erased frame receipt state. A corresponding apparatus is also described.

In another embodiment, the present invention provides a method of supplying frame classification information by an anchor base station to a frame selection algorithm, the anchor base station having at least an idle frame receipt state; a good frame receipt state, and an erased frame receipt state; the method comprising: in response to being in the good frame receipt state and receiving neither a frame nor a header from the first radio base station at a frame boundary, the anchor base station supplying an indication, corresponding to the first base station, to the frame selection algorithm indicating an idle frame and transitioning to the idle frame receipt state; in response to being in the idle frame receipt state and receiving neither a frame nor a header from the first radio base station at a frame boundary, the anchor base station supplying an indication, corresponding to the first base station, to the frame selection algorithm indicating an idle frame and remaining in the idle frame receipt state. A corresponding apparatus is also described.

DETAILED DESCRIPTION OF THE INVENTION

The present invention relates to controlling packet forwarding operations in a wireless communications system having a plurality of mobile stations operating therein. As such, a brief overview of exemplary wireless communication systems may aid in understanding the present invention.

Figure 1:
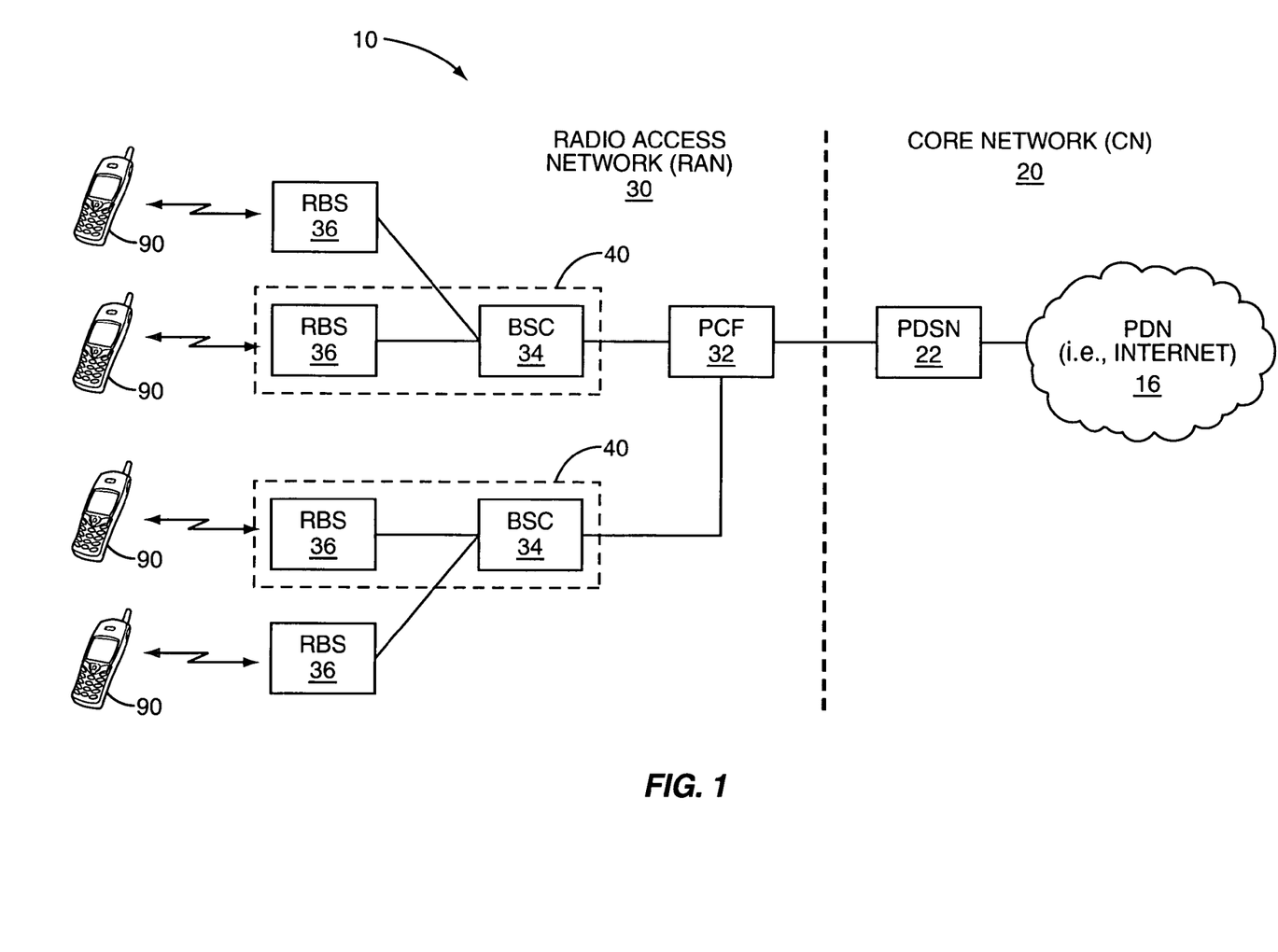
FIG. 1 shows an exemplary wireless communication system.

FIG. 1 illustrates the logical entities of an exemplary wireless communication network 10 that provides packet data services to mobile stations 90. In general, the wireless communication network 10 may be configured according to the TIA-2000 standard, W-CDMA standard, 1xEV-DO, Worldwide Interoperability for Microwave Access (also known as WiMAX, see IEEE 802.16), or other standard. Advantageously, the wireless communication network 10 is a packet-switched network that employs a forward packet data channel (F-PDCH) to transmit traffic data to the mobile stations 90 and a reverse packet data channel (R-PDCH) to receive traffic data from the mobile stations 90. Wireless communication network 10 includes a packet-switched core network 20 and a radio access network (RAN) 30. The core network 20 includes a Packet Data Serving Node (PDSN) 22 that connects to an external packet data network (PDN) 16, such as the Internet, and supports PPP connections to and from the mobile stations 90. Core network 20 adds and removes IP streams to and from the RAN 30 and routes packets between the external packet data network 16 and the RAN 30.

RAN 30 connects to the core network 20 and gives mobile stations 90 access to the core network 20. RAN includes a Packet Control Function (PCF) 32, one or more base station controllers (BSCs) 34 and one or more radio base stations (RBSs) 36. The primary function of the PCF 32 is to establish, maintain, and terminate connections to the PDSN 22. The BSCs 34 manage radio resources within their respective coverage areas. The RBSs 36 include the radio equipment for communicating over the air interface with mobile stations 90. A BSC 34 can manage more than one RBS 36. In this illustrative embodiment, a BSC 34 and an RBS 36 comprise a base station 40, while the BSC 34 is the control part of the base station 40. The RBS 36 is the part of the base station 40 that includes the radio equipment and is normally associated with a cell site. As shown, a single BSC 34 may function as the control part of multiple base stations 40. In other network architectures, the network components comprising the base station 40 may be different, but the overall functionality will be the same or similar. For example, see the discussion below regarding FIGS. 3-4.

Figure 2:
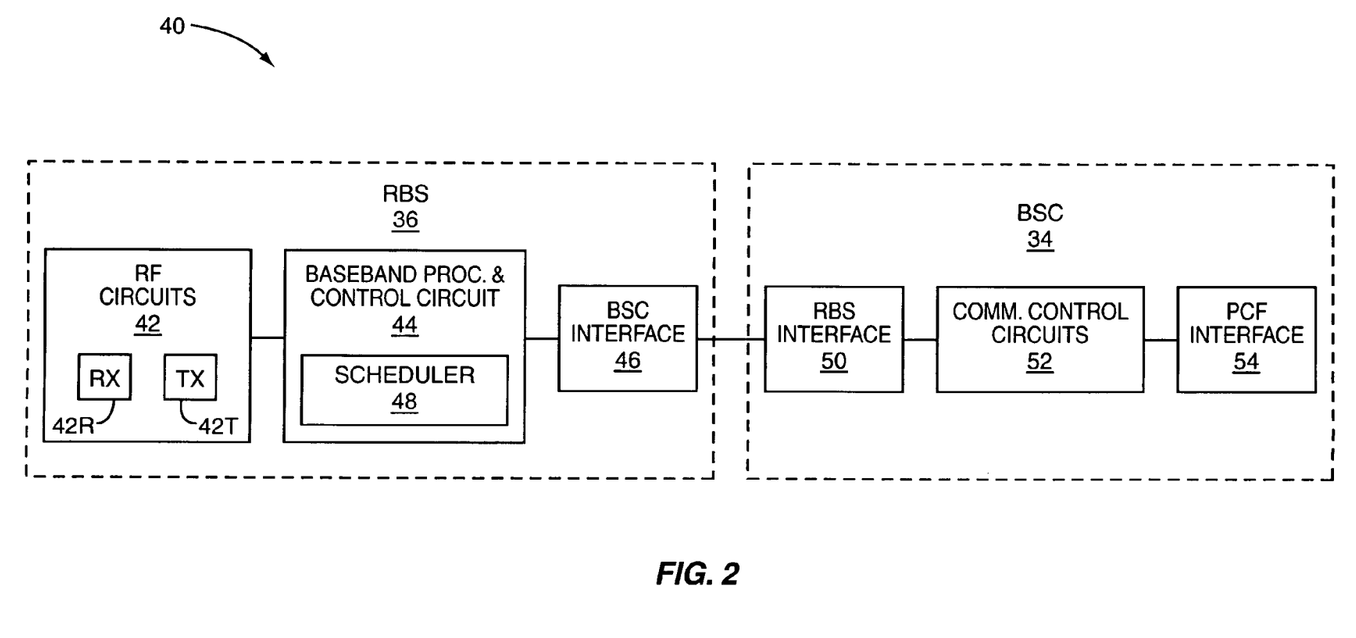
FIG. 2 shows an exemplary base station configuration.

Referring to FIG. 2, the components in the exemplary base station embodiment are distributed between a RBS 36 and a BSC 34. The RBS 36 includes RF circuits 42, baseband processing and control circuits 44, and interface circuits 46 for communicating with the BSC 34. The RF circuits 42 include one or more transmitters 42T and receivers 42R, which transmit signals to, and receive signals from, the mobile stations 40. For example, the receiver 42T receives reverse link data packets transmitted by the mobile stations 90 and passes the same on to the baseband processing and control circuits 44 for processing. The baseband processing and control circuits 44 perform baseband processing of transmitted and received signals. In the embodiment shown in FIG. 2, the baseband processing and control circuit 44 includes a scheduler 48 to schedule packet data transmissions on the Forward Packet Data Channel (F-PDCH). The scheduler 48 makes scheduling decisions and selects the appropriate modulation and coding schemes for downlink transmissions based on, inter alia, channel feedback from the mobile stations 90. The baseband processing and control circuit 44 may be implemented as one or more processing circuits, comprising hardware, software, or any combination thereof, that are configured as appropriate to implement one or more of the processes described herein. For example, the baseband processing and control circuit 44 may be implemented as stored program instructions executed by one or more microprocessors or other logic circuits included in RBS 36.

The BSC 34 includes interface circuits 50 for communicating with the RBS 36, communication control circuits 52, and interface circuits 54 for communicating with PCF. The communication control circuits 52 manage the radio and communication resources used by the base station 40. The communication control circuits 52 are responsible for setting up, maintaining and tearing down communication channels between the RBS 36 and mobile station 90. The communication control circuits 52 may also allocate Walsh codes and perform power control functions. The communication control circuits 52 may be implemented in software, hardware, or some combination of both. For example, the communication control circuits 52 may be implemented as stored program instructions executed by one or more microprocessors or other logic circuits included in BSC 34.

Figure 3:
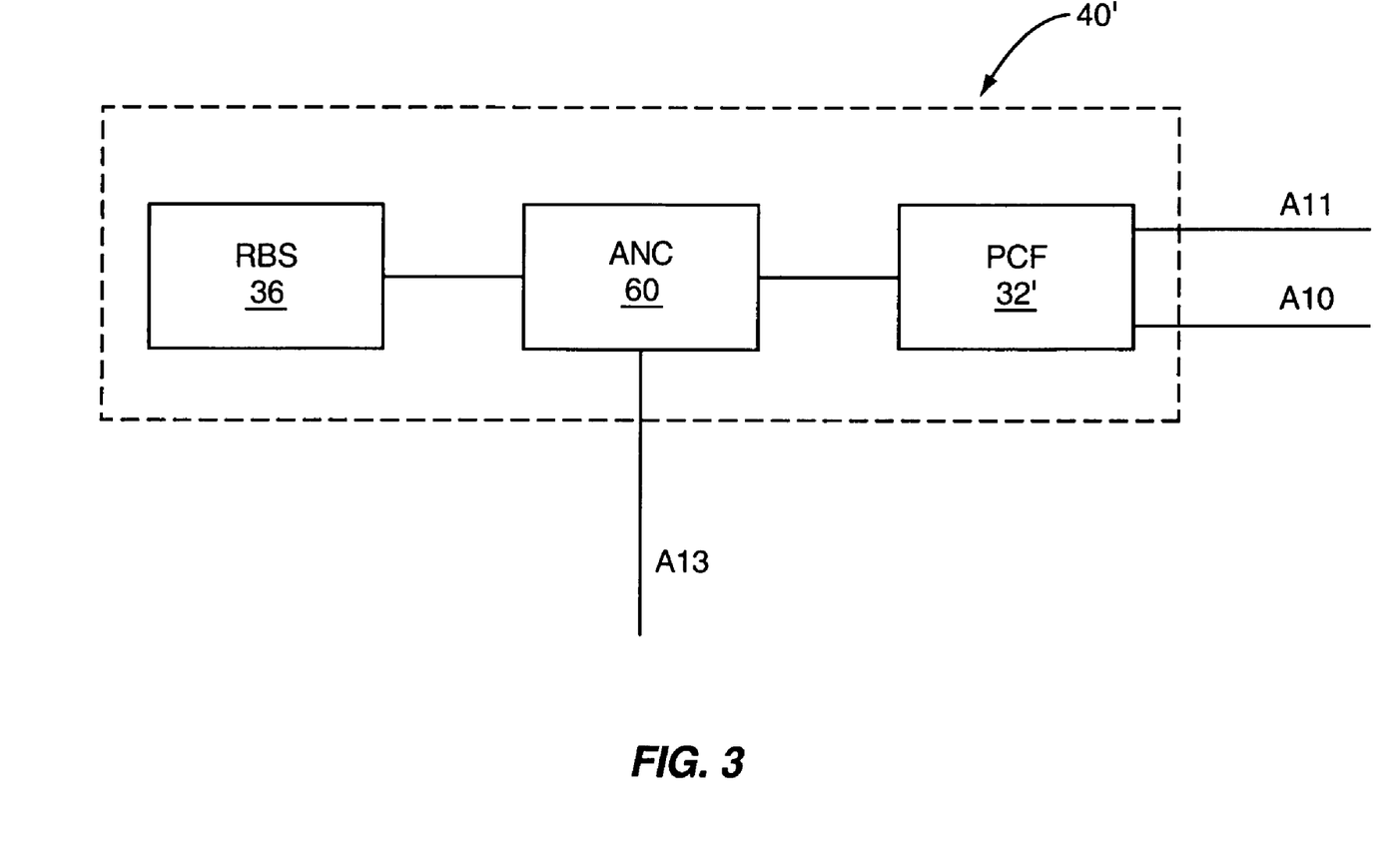
FIG. 3 shows another exemplary base station configuration.
Figure 4:
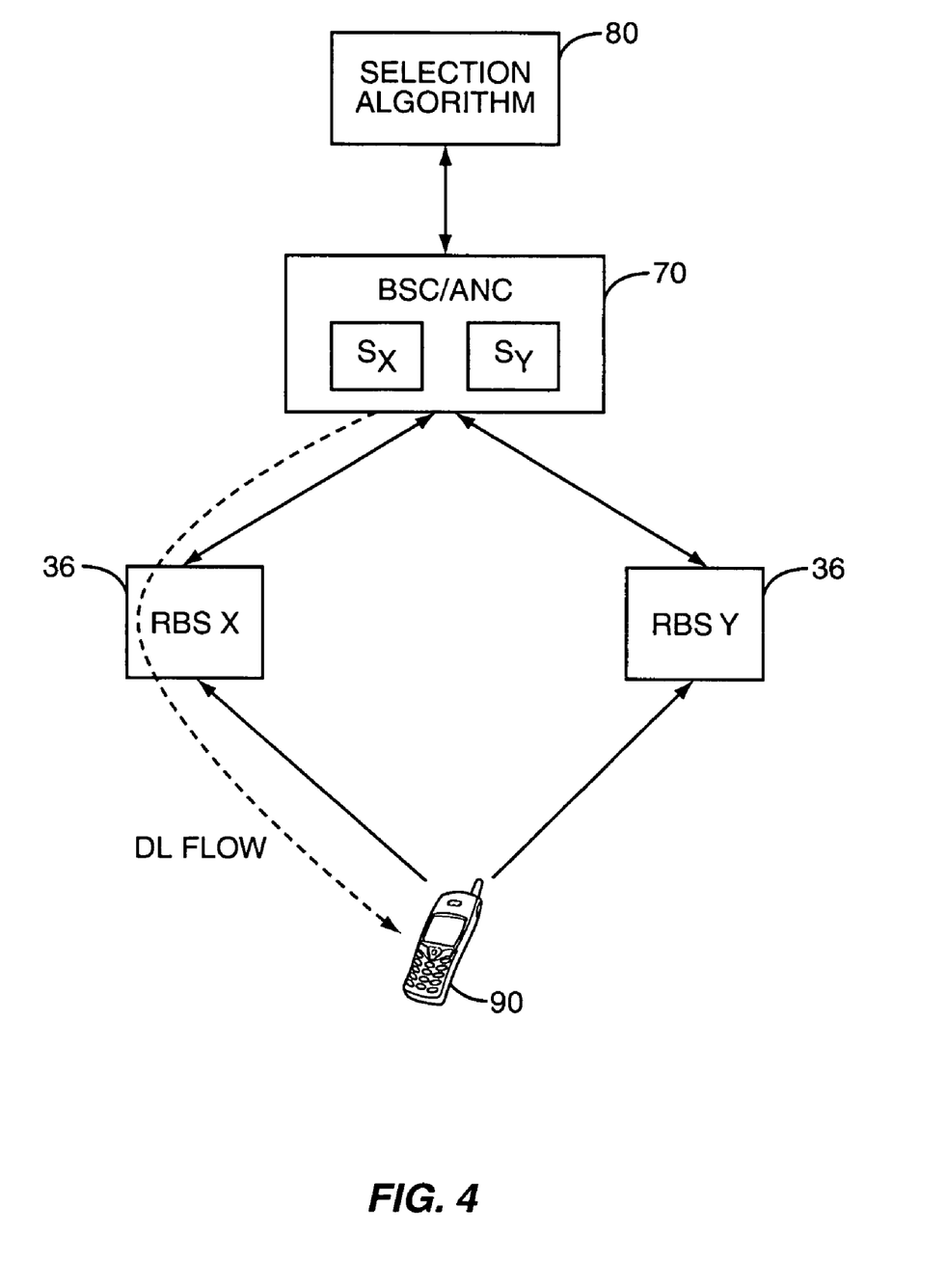
FIG. 4 shows a mobile station communicating with multiple RBSs, such as during soft handoff.

Some exemplary wireless communications systems 10 are less centralized than the wireless communications system 10 of FIGS. 1-2. For these systems, it is not uncommon for the functionality of the BSC 34 and the PCF 32 to be dedicated to a specific RBS 36 and pushed downward to be co-located with that RBS. For example, FIG. 3 shows a base station 40' in such an architecture. The base station 40' has an access network controller (ANC) 60 and a packet control function (PCF) 32'. ANC 60 functions similar to the communication control circuit 52 of FIG. 2's BSC 34 in that it manages radio resources for the associated RBS 36. PCF 32' functions similar to PCF 32 of FIG. 1 in that it functions to establish, maintain, and terminate connections to the PDSN 22. With reference to FIG. 4, packet data between the base station 40' and the PDSN 22 may travel over an A10 communication link, while signaling data may travel between the base station 40' and PDSN 22 over an A11 link. Communications between ANCs 60 of different base stations 40' travel over an A13 communication link; which is sometimes referred to as a sidehaul connection. The base stations 40' may operate, for example, according to TIA-856-A, which defines an air interface between the base station 40' and mobile station 90. Those skilled in the art will appreciate that the present invention may also use other air interface standards, as indicated above.

A mobile station 90 may receive downlink (DL) transmissions, indicated in dashed lines in FIG. 4, from an RBS 36 operating under the control of an BSC/ANC 70. The designation "BSC/ANC" is used in FIG. 4 because either a BSC 34 or an ANC 60 may be responsible for controlling the RBS 36, depending on the system architecture. While a single RBS 36 may be serving the mobile station 90 on the downlink, a plurality of RBS 36 may be receiving reverse link transmissions from a given mobile station 90 in a given situation, such as during soft handoff. For simplicity, two RBS—labeled X and Y—are shown, but it should be understood that there may be three or more RBSs 36. These two RBS 36 both communicate with BSC/ANC 70, which in turn communicates with a frame selection algorithm 80. The frame selection algorithm 80 is typically located in the call anchor, and is involved with supplying information for outer loop power control and the like. The call anchor is typically the BSC/ANC 70 through which the mobile station 90 initially set up the communications session, as is well known in the art.

Conceptually reverse link frames are received at RBS X-Y from mobile station 90, and forwarded to BSC/ANC 70. The BSC/ANC 70 examines the classification (e.g., good, idle, erased) of the frames from each RBS 36, and forwards an appropriate indication to the frame selection algorithm 80 for further processing. To do so in conventional systems, each RBS 36 forwards its classification of the frame to the BSC/ANC 70, thereby imposing a load on the backhaul communications link between the BSC/ANC 70 and the various RBS X-Y. The present invention provides a means for lessening this loading in some circumstances.

Figure 5:
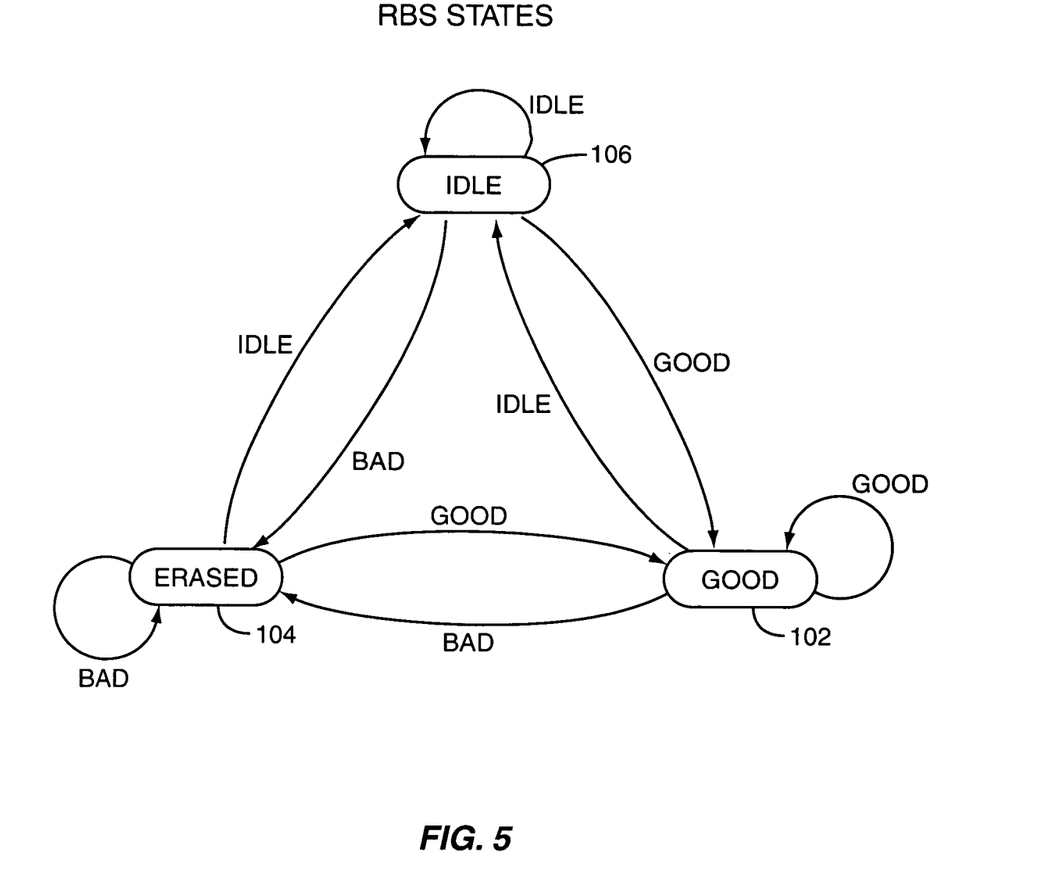
FIG. 5 shows a state diagram for a radio base station according to one embodiment of the present invention.

In the present invention, each RBS 36 may be thought of as operating in three different states depending on the classification of the last frame from mobile station 90. For simplicity, the three states are referred to as the Good Frame State 102, Erased Frame State 104, and the Idle Frame State 106. See FIG. 5. For each frame received, or at the corresponding frame boundary if no frame is received, the RBS 36 controls its operational state and the information sent (or not sent) to the BSC/ANC 70 based on the classification of the "new" frame. For purposes of this illustrative example, it will be assumed that each new frame may be classified as either Good, Idle, or Bad. Good frames are frames that are properly received and decoded, and typically contain a data payload. Bad frames are frames that are improperly received and/or are not decoded correctly. Idle frames are frames where the frame boundary is encountered without receiving reverse link transmissions from the mobile station 90. Depending on the new frame's classification and the RBS's current operational state, the RBS 36 responds as shown in FIG. 5 and described below.

If the RBS 36 is in the Good Frame State 102 the RBS 36 responds as follows: 1) if the new frame is a Good frame, the RBS 36 sends the frame payload to the BSC/ANC 70 along with a corresponding header, and remains in the Good Frame State 102; 2) if the new frame is a Bad frame, the RBS 36 sends a header with an erasure indication to the BSC/ANC 70, but not the frame's payload, and transitions to the Erased Frame State 104; 3) if the new frame is an Idle frame, the RBS 36 sends a header with an idle indication to the BSC/ANC 70, but not the frame's payload, and transitions to the Idle Frame State 106.

If the RBS 36 is in the Erased Frame State 104 the RBS 36 responds as follows: 1) if the new frame is a Good frame, the RBS 36 sends the frame payload to the BSC/ANC 70 along with a corresponding header, and transitions to the Good Frame State 102; 2) if the new frame is a Bad frame, the RBS 36 refrains from sending a header or the frame's payload to the BSC/ANC 70 (i.e., sends neither) and remains in the Erased Frame State 104; 3) if the new frame is an Idle frame, the RBS 36 sends a header with an idle indication to the BSC/ANC 70, but not the frame's payload, and transitions to the Idle Frame State 106.

If the RBS 36 is in the Idle Frame State 106 the RBS 36 responds as follows: 1) if the new frame is a Good frame, the RBS 36 sends the frame payload to the BSC/ANC 70 along with a corresponding header, and transitions to the Good Frame State 102; 2) if the new frame is a Bad frame, the RBS 36 sends a header with a erasure indication, but not the frame's payload, to the BSC/ANC 70 and transitions to the Erased Frame State 104; 3) if the new frame is an Idle frame, the RBS 36 refrains from sending a header or the frame's payload to the BSC/ANC 70 (i.e., sends neither) and remains in the Idle Frame State 106.

Thus, as can be seen, the illustrative embodiment of the RBS 36 logic refrains from sending Idle frame headers and Erased frame headers to the BSC/ANC 70 if the RBS 36 is already in corresponding state. As such, the load on the backhaul communication link to the BSC/ANC 70 is reduced when multiple Idle frames are encountered in succession and when multiple Erased frames are encountered in succession.

Figure 6:
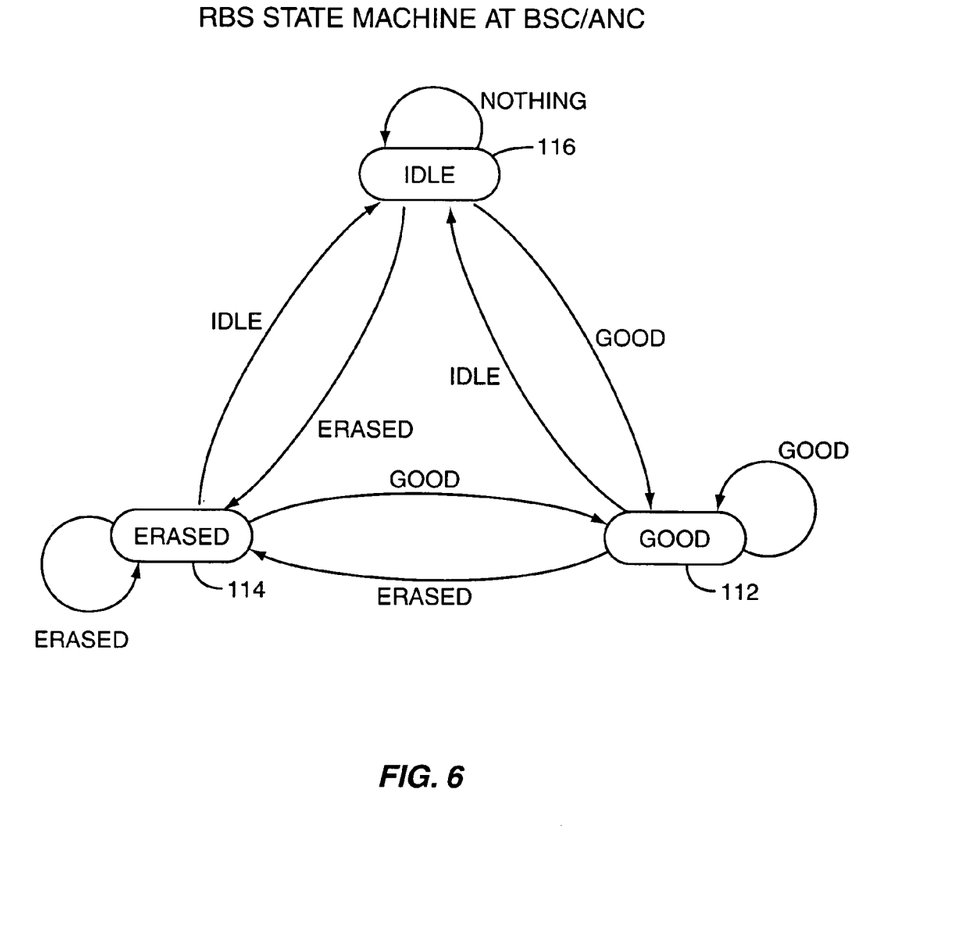
FIG. 6 shows a state diagram for a BSC/ANC according to one embodiment of the present invention.

Some complementary changes in logic at the BSC/ANC 70 allow the presence of the present invention to be transparent to the frame selection algorithm. At the BSC/ANC 70, the Good/Idle/Erased frame inputs for the new frame from the various RBSs 36 are examined, and a corresponding frame indication (and sometimes payload) are sent to the frame selection algorithm 80. In essence, the BSC/ANC 70 maintains a state machine S for each RBS 36 in the active set (e.g., $S_X$, $S_Y$) that reports to that BSC/ANC 70, and the inputs to the frame selection algorithm 80 for each RBS 36 are determined based on the current state of the corresponding state machine and the classification of the "new" frame from that RBS 36. Each state machine $S_X, S_Y$ in the BSC/ANC 70 may be thought of as having three operational states: Good State 112, Erased State 114, and Idle State 116. Depending on the frame classification data from the corresponding RBS 36 and the state machine's current operational state, the state machine $S_X, S_Y$ responds as shown in FIG. 6 and described below.

If the state machine ($S_X$ or $S_Y$) is in the Good State 112, the state machine responds as follows: 1) for a Good frame indication from the RBS 36, the state machine indicates a Good frame to the frame selection algorithm 80, forwards the corresponding frame payload to the appropriate entities for further processing, and remains in the Good State 112; 2) for a Erased frame indication from the RBS 36, the state machine indicates an Erased frame to the frame selection algorithm 80 and transitions to the Erased State 114; 3) for an Idle frame indication from the RBS 36, the state machine sends an idle indication to the frame selection algorithm 80 and transitions to the Idle State 116.

If the state machine ($S_X$ or $S_Y$) is in the Erased State 114 the state machine responds as follows: 1) for a Good frame indication from the RBS 36, the state machine indicates a Good frame to the frame selection algorithm 80, forwards the corresponding frame payload to the appropriate entities for further processing, and transitions to the Good State 112; 2) if the state machine does not receive any frame classification indication from the RBS 36 at the frame boundary, thereby indicating an Erased frame, the state machine indicates an Erased frame to the frame selection algorithm 80 and remains in the Erased State 114; 3) for an Idle frame indication from the RBS 36, the state machine sends an Idle frame indication to the frame selection algorithm 80 and transitions to the Idle State 116.

If the state machine ($S_X$ or $S_Y$) is in the Idle State 116, the state machine responds as follows: 1) for a Good frame indication from the RBS 36, the state machine indicates a Good frame to the frame selection algorithm 80, forwards the corresponding frame payload to the appropriate entities for further processing, and transitions to the Good State 112; 2) for a Erased frame indication from the RBS 36, the state machine indicates an Erased frame to the frame selection algorithm 80 and transitions to the Erased State 114; 3) if the state machine does not receive any frame classification indication from the RBS 36 at the frame boundary, thereby indicating an Idle frame, the state machine sends an indication of an Idle frame to the frame selection algorithm 80 and remains in the Idle State 116.

As can be seen, the logic of the state machine ($S_X$ or $S_Y$) in effect supplies the "missing" indications of frame classification to the frame selection algorithm 80 for those classification reports that were abstained from due to the logic of FIG. 5. Thus, the frame selection algorithm 80 is not adversely affected by the reduction in backhaul communication link loading made available by the present invention.

Figure 7:
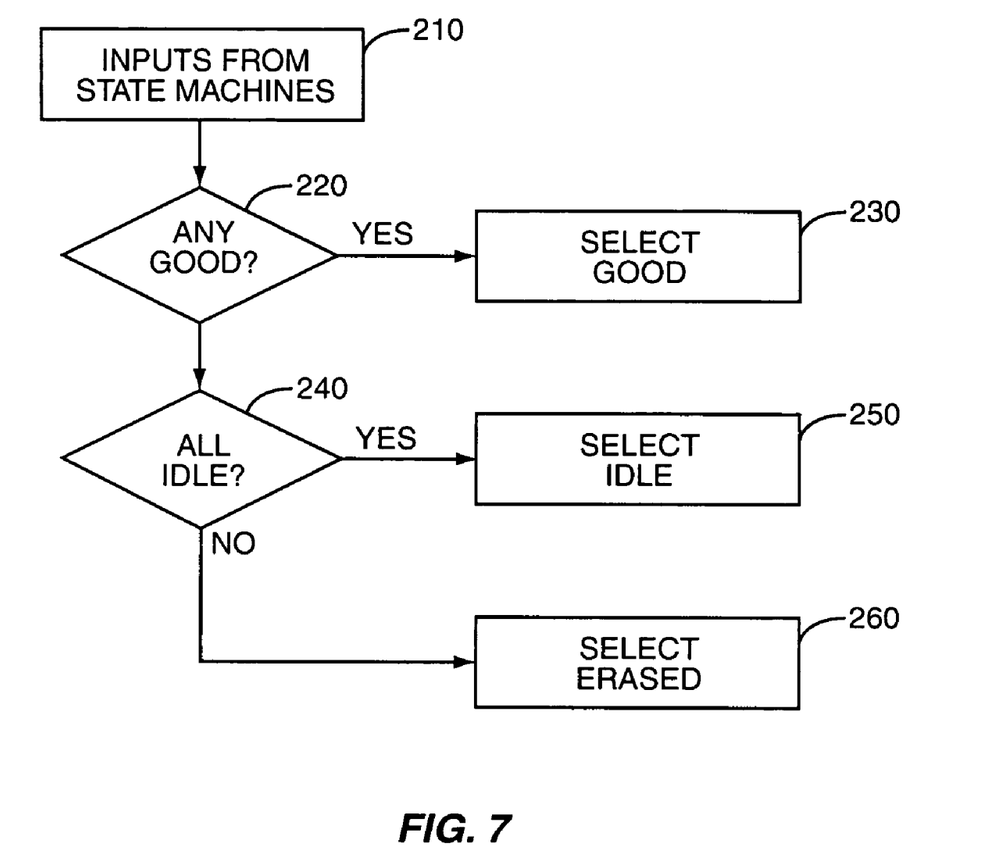
FIG. 7 shows a process flowchart for a frame selection algorithm useful with various embodiments of the present invention.

The frame selection algorithm 80 may function to select the good frame when any of the state machines $S_X, S_Y$ indicate a Good frame; select an idle frame when at all the state machines $S_X, S_Y$ indicate an Idle frame; and select an erased frame when any of the state machines $S_X, S_Y$ indicate an Erased frame with no state machines $S_X, S_Y$ indicating a Good frame. An exemplary process flowchart for this process is shown in FIG. 7. At step 210, the inputs from the various state machines $S_X, S_Y$ for all of the RBSs 36 in the active set are collected. If any of the state machines $S_X, S_Y$ indicate a Good frame (step 220), a Good frame is selected (step 230). If not, the process proceeds to check whether all of the state machines $S_X, S_Y$ indicate an Idle frame (step 240). If so, an Idle frame is selected (step 250). If not, then, in this example, all state machines $S_X, S_Y$ must be indicating an Erased frame, and an Erase frame is selected (step 260).

In some embodiments, an alternative approach may be taken that implicitly indicates an Idle frame after a Good frame. For this embodiment, the RBS 36 may operate generally as described above, but when an Idle frame is detected while in the Good Frame State 102, the RBS 36 may not send the header to the BSC/ANC 70. That is, if the RBS 36 is in the Good Frame State 102, the RBS 36 responds to an Idle frame by refraining from sending a header to the BSC/ANC 70 (i.e., sends nothing) and transitions to the Idle Frame State 106. To handle this modification, the logic of the BSC/ANC 70 is modified for the Good State 112. In this embodiment, if the state machine ($S_X$ or $S_Y$) is in the Good State 112, and no frame classification indication is received from the RBS 36 at the frame boundary, this is treated as an Idle frame indication, and the state machine sends an indication of an Idle frame to the frame selection algorithm 80 and transitions to the Idle State 116. As before, this modification is essentially transparent to the frame selection algorithm 80.

As can be appreciated, loading on the backhaul communication link from the RBSs 36 to the BSC/ANC 70 may be reduced via the present invention. While it is believed the most load reduction is achieved if both the Idle frames and Erased frames are handled as described above, some embodiments of the present invention handle only Idle frames or only Erased frames as described above, and resort to conventional handling of the other frame classifications.

As pointed out above, the present invention may be practiced in a wide variety of system architectures. Further, it should be noted that the BSC/ANC 70 providing the state machine functionality used to generate the indications input to the frame selection algorithm may be the call anchor or may be some other BSC/ANC 70 in the system 10.

As used herein, the term "mobile station" 90 may include a cellular radiotelephone, a Personal Communications System (PCS) terminal that may combine a cellular radiotelephone with data processing, facsimile, and data communications capabilities; a Personal Data Assistant (PDA) that may include a pager, Web browser, radiotelephone, Internet/intranet access, organizer, calendar, and a conventional laptop and/or palmtop receiver or other appliances that include a radiotelephone transceiver.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of controlling frame forwarding operations of a first radio base station in a wireless communications system, comprising:
   receiving first and second successive frames from a mobile station at said first radio base station, said second frame received after said first frame;
   classifying said first and second frames at said first radio base station;
   in response to both said first and second frames being classified differently, said first radio base station sending at least a header associated with said second frame to a call anchor associated with said mobile station; said header indicating the classification of said second frame;
   in response to both said first and second frames being classified as erased frames, said first radio base station abstaining from sending said header to said call anchor.

2. The method of claim 1 wherein if said second frame is classified as a good frame, said first radio station sending at least a header associated with said second frame to said call anchor comprises said first radio station sending said header and a payload associated with said second frame to said call anchor.

3. The method of claim 1 further comprising classifying said frames as idle frames if a frame boundary is encountered without receipt of corresponding frame transmissions from said mobile station.

4. The method of claim 1 further comprising, if both said first and second frames are classified as idle frames, said first radio base station abstaining from sending said header to said call anchor.

5. The method of claim 1 wherein classifying said first and second frames at said first radio base station comprises classifying said frames as either good, idle, or erased.

6. A method of controlling frame forwarding operations of a first radio base station in a wireless communications system, comprising:
   classifying first and second frames associated with a mobile station at a first radio base station, said second frame immediately successive to said first frame;
   in response to both said first and second frames being classified differently, said first radio base station sending at least a header associated with said second frame to a call anchor associated with said mobile station; said header indicating the classification of said second frame;
   in response to both said first and second frames being classified as idle frames, said first radio base station abstaining from sending said header to said call anchor.

7. The method of claim 6 wherein if said second frame is classified as a good frame, said first radio station sending at least a header associated with said second frame to said call anchor comprises said first radio station sending said header and a payload associated with said second frame to said call anchor.

8. The method of claim 6 further comprising classifying said frames as idle frames if a corresponding frame boundary is encountered without receipt of corresponding frame transmissions from said mobile station.

9. The method of claim 6 wherein classifying said first and second frames at said first radio base station comprises classifying said frames as either good, idle, or erased.

10. A method of controlling frame forwarding operations of a first radio base station in a wireless communications system; said first radio base station having at least an idle frame state; a good frame state, and an erased frame state; said method comprising:
    receiving a reverse link frame from a mobile station at the first radio base station while the first radio base station is in said erased frame state;
    classifying said received frame by said first radio base station;
    in response to said received frame being classified as a good frame, said first radio base station sending said received frame and a header to a call anchor associated with said mobile station and transitioning to said good frame state;
    in response to said received frame being classified as an erased frame, said first radio base station abstaining from sending said frame to said call anchor and abstaining from sending said header to said call anchor, and further remaining in said erased frame state;
    in response to said received frame being classified as an idle frame, said first radio base station sending said header to said call anchor but abstaining from sending said frame to said call anchor; said header comprising an idle indication; and further transitioning to said idle frame state.

11. The method of claim 10 wherein said classifying said received frame comprises classifying said received frame as idle if a frame boundary is encountered without receipt of corresponding frame transmissions from said mobile station.

12. A method of controlling frame forwarding operations of a first base station in a wireless communications system; said base station having at least an idle frame state; a good frame state, and an erased frame state; said method comprising:
    receiving a reverse link packet from a mobile station at said first base station while first said base station is in said idle frame state;
    classifying said received frame;
    in response to said received frame being classified as a good frame, said first base station sending said received frame and a header to a call anchor associated with said mobile station and transitioning to said good frame state;
    in response to said received frame being classified as an erased frame, said first base station abstaining from sending said frame to said call anchor but sending said header to said call anchor; said header comprising an erasure indication; and further transitioning to said erased frame state;
    in response to said received frame being classified as an idle frame, said first base station abstaining from sending said frame to said call anchor, abstaining from sending said header to said call anchor, and remaining in said idle state.

13. A method of supplying frame classification information by an anchor base station to a frame selection algorithm, said anchor base station having at least an idle frame receipt state; a good frame receipt state, and an erased frame receipt state; said method comprising:
    in response to being in said idle frame receipt state and receiving neither a frame nor a header from said first radio base station at a frame boundary, said anchor base station supplying an indication, corresponding to said first base station, to said frame selection algorithm indicating an idle frame and remaining in said idle frame receipt state; and in response to being in said erased frame receipt state and receiving neither a frame nor a header from a first radio base station at a frame boundary, said anchor base station supplying an indication, corresponding to said first base station, to said frame selection algorithm indicating an erased frame and remaining in said erased frame receipt state.

14. The method of claim 13 further comprising said anchor base station supplying an indication, corresponding to said first base station, to said frame selection algorithm indicating an idle frame and transitioning to said idle frame receipt state in response to being in said good frame receipt state and receiving neither a frame nor a header from a first radio base station at a frame boundary.

15. The method of claim 13 further comprising said anchor base station:
supplying an indication, corresponding to said first base station, to said frame selection algorithm indicating a good frame and remaining in said good frame receipt state in response to being in said good frame receipt state and receiving a good frame indication;
supplying an indication, corresponding to said first base station, to said frame selection algorithm indicating an idle frame and transitioning to said idle frame receipt state in response to being in said good frame receipt state and receiving neither a frame nor a header from a first radio base station at a frame boundary;
supplying an indication, corresponding to said first base station, to said frame selection algorithm indicating an erased frame and transitioning to said erased frame receipt state in response to being in said good frame receipt state and receiving an erased frame indication;
supplying an indication, corresponding to said first base station, to said frame selection algorithm indicating a good frame and transitioning to said good frame receipt state in response to being in said erased frame receipt state and receiving a good frame indication;
supplying an indication, corresponding to said first base station, to said frame selection algorithm indicating an idle frame and transitioning to said idle frame receipt state in response to being in said erased frame receipt state and receiving an idle frame indication;
supplying an indication, corresponding to said first base station, to said frame selection algorithm indicating a good frame and transitioning to said good frame receipt state in response to being in said idle frame receipt state and receiving a good frame indication; and
supplying an indication, corresponding to said first base station, to said frame selection algorithm indicating an erased frame and transitioning to said erased frame receipt state in response to being in said idle frame receipt state and receiving an erased frame indication.

16. A radio base station for a wireless communications system, comprising:
a receiver operative to receive first and second frames from a mobile station on a reverse link; said second frame immediately successive to said first frame;
one or more processing circuits operatively coupled to said receiver and configured to:
classify said first and second frames;
send at least a header associated with said second frame to a call anchor associated with said mobile station in response to both said first and second frames being classified differently; said header indicating the classification of said second frame;
abstain from sending said header to said call anchor in response to both said first and second frames being classified as idle frames.

17. The radio base station of claim 16 wherein said one or more processing circuits are further configured to, if said second frame is classified as a good frame, send said header and a payload associated with said second frame to said call anchor.

18. The radio base station of claim 16 wherein said one or more processing circuits are further configured to classify said frames as idle frames if a corresponding frame boundary is encountered without receipt of corresponding frame transmissions from said mobile station.

19. The radio base station of claim 16 wherein said one or more processing circuits are further configured to classify said first and second frames as either good, idle, or erased.

20. A radio base station for a wireless communications system, comprising:
a receiver operative to receive first and second frames from a mobile station on a reverse link; said second frame immediately successive to said first frame;
one or more processing circuits operatively coupled to said receiver and configured to:
classify said first and second frames;
send at least a header associated with said second frame to a call anchor associated with said mobile station in response to both said first and second frames being classified differently; said header indicating the classification of said second frame;
abstain from sending said header to said call anchor in response to both said first and second frames being classified as erased frames.

21. An anchor base station in a wireless communications system, comprising:
at least a first radio base station operative to receive reverse link transmissions from a plurality of mobile stations, including at least a first mobile station;
one or more processing circuits operatively coupled to said radio base station and configured to:
track a frame receipt state associated with said first mobile station between at least an idle frame receipt state; a good frame receipt state, and an erased frame receipt state;
supply an indication, corresponding to said first radio base station, to a frame selection algorithm indicating an erased frame in response to being in said erased frame receipt state and receiving neither a frame nor a header from said radio base station at a frame boundary; and
supply an indication, corresponding to said first radio base station, to a frame selection algorithm indicating an idle frame in response to being in said idle frame receipt state and receiving neither a frame nor a header from said radio base station at a frame boundary.

22. The anchor base station of claim 21 wherein said one or more processing circuits are further configured to: supply an indication, corresponding to said first radio base station, to a frame selection algorithm indicating an idle frame in response to being in said good frame receipt state and receiving neither a frame nor a header from said radio base station at a frame boundary.

23. A method of controlling frame forwarding operations of a first radio base station in a wireless communications system, comprising:

receiving first and second successive frames from a mobile station at said first radio base station, said second frame received after said first frame;

classifying said first and second frames at said first radio base station;

in response to both said first and second frames being classified differently, said first radio base station:
  if said second frame is other than an idle frame, sending at least a header associated with said second frame to a call anchor associated with said mobile station; said header indicating the classification of said second frame;
  if said second frame is an idle frame and said first frame is an erased frame, sending said header to said call anchor; said header indicating the classification of said second frame;
  if said second frame is an idle frame and said first frame is a good frame, abstaining from sending said header to said call anchor;

in response to both said first and second frames being classified as idle frames, said first radio base station abstaining from sending said header to said call anchor.

24. A method of supplying frame classification information by an anchor base station to a frame selection algorithm, said anchor base station having at least an idle frame receipt state; a good frame receipt state, and an erased frame receipt state; said method comprising:

in response to being in said good frame receipt state and receiving neither a frame nor a header from said first radio base station at a frame boundary, said anchor base station supplying an indication, corresponding to said first base station, to said frame selection algorithm indicating an idle frame and transitioning to said idle frame receipt state;

in response to being in said idle frame receipt state and receiving neither a frame nor a header from said first radio base station at a frame boundary, said anchor base station supplying an indication, corresponding to said first base station, to said frame selection algorithm indicating an idle frame and remaining in said idle frame receipt state.

* * * * *

UNITED STATES PATENT AND TRADEMARK OFFICE
CERTIFICATE OF CORRECTION

PATENT NO. : 7,376,102 B2
APPLICATION NO. : 11/291364
DATED : May 20, 2008
INVENTOR(S) : Shahidi et al.

Page 1 of 1

It is certified that error appears in the above-identified patent and that said Letters Patent is hereby corrected as shown below:

On the Face Page, in Field (73), under "Assignee", in Column 1, Line 2, delete "(publ)" and insert -- (publ), Stockholm --, therefor.

On Page 2, in Field (56), under "U.S. PATENT DOCUMENTS", in Column 1, Line 6, delete "Wilenegger et al." and insert -- Willenegger et al. --, therefor.

Signed and Sealed this

Tenth Day of March, 2009

JOHN DOLL
*Acting Director of the United States Patent and Trademark Office*